US009798305B2

(12) United States Patent
Chida et al.

(10) Patent No.: US 9,798,305 B2
(45) Date of Patent: Oct. 24, 2017

(54) CALCULATION DEVICE

(71) Applicant: OLYMPUS CORPORATION, Tokyo (JP)

(72) Inventors: Kazue Chida, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 442 days.

(21) Appl. No.: 14/537,208

(22) Filed: Nov. 10, 2014

(65) Prior Publication Data

US 2015/0142136 A1    May 21, 2015

(30) Foreign Application Priority Data

Nov. 15, 2013  (JP) ................................ 2013-236904

(51) Int. Cl.
| | |
|---|---|
| G05B 15/02 | (2006.01) |
| G06F 9/38 | (2006.01) |
| G06F 15/16 | (2006.01) |
| G06F 15/173 | (2006.01) |
| G06F 17/10 | (2006.01) |

(52) U.S. Cl.
CPC ............. *G05B 15/02* (2013.01); *G06F 9/38* (2013.01); *G06F 17/10* (2013.01)

(58) Field of Classification Search
CPC .......... G05B 15/02; G06F 9/38; G06F 17/10; G06Q 10/06
See application file for complete search history.

(56) References Cited

U.S. PATENT DOCUMENTS 5,765,011 A * 6/1998 Wilkinson ............. G06F 7/483
                                                      712/20
6,094,715 A * 7/2000 Wilkinson ............. G06F 7/483
                                                      712/20
(Continued)

FOREIGN PATENT DOCUMENTS

| JP | 2006-190104 A | 7/2006 |
|---|---|---|
| JP | 2006-236325 A | 9/2006 |

(Continued)

OTHER PUBLICATIONS

Bezerra et al., Job scheduling for optimizing data locality in Hadoop clusters, Sep. 2013, 6 pages.*

(Continued)

*Primary Examiner* — Thuy Dao
(74) *Attorney, Agent, or Firm* — Westerman, Hattori, Daniels & Adrian, LLP

(57) ABSTRACT

A calculation device includes a plurality of calculation processing units configured to perform different processes with each other, a plurality of calculators configured to perform a same calculation, and a control unit configured to control a number of the calculators to be operated during each of a plurality of divided periods based on a length of a predetermined processing period and a number of calculations to be performed, such that a number of data which is equal to a number of calculations is processed within a predetermined processing period, and that the number of the calculators to be operated during each of the plurality of divided periods is averaged, the divided periods being obtained by dividing up the predetermined processing period.

5 Claims, 12 Drawing Sheets

(56) References Cited

U.S. PATENT DOCUMENTS

| | | | | |
|---|---|---|---|---|
| 8,717,178 B2* | 5/2014 | Fujimoto | ............... | G06Q 10/06 |
| | | | | 340/572.1 |
| 8,751,432 B2* | 6/2014 | Berg-Sonne | ........... | G05B 15/02 |
| | | | | 706/12 |
| 8,849,771 B2* | 9/2014 | Berg-Sonne | ........... | G05B 15/02 |
| | | | | 707/687 |
| 9,442,470 B2* | 9/2016 | Noureldin | ............... | G05B 15/02 |
| 2011/0071873 A1* | 3/2011 | Vaughan | ................ | G06Q 10/06 |
| | | | | 705/7.28 |
| 2015/0324323 A1* | 11/2015 | Miyakoshi | .............. | G06F 17/10 |
| | | | | 345/505 |
| 2016/0184155 A1* | 6/2016 | Streeter | ................. | G05B 15/02 |
| | | | | 700/282 |

FOREIGN PATENT DOCUMENTS

| JP | 2006-344162 A | 12/2006 |
|---|---|---|
| JP | 2008-282360 A | 11/2008 |

OTHER PUBLICATIONS

Zhuravlev et al., AKULA: A toolset for experimenting and developing thread placement algorithms on multicore systems, Sep. 2010, 11 pages.*

Zakay et al., Workload resampling for performance evaluation of parallel job schedulers, Apr. 2013, 11 pages.*

Office Action dated May 30, 2017, issued in counterpart Japanese Application No. 2013-236904, with English translation (6 pages).

* cited by examiner

CALCULATION DEVICE

BACKGROUND OF THE INVENTION

Field of the Invention

The present invention relates to a calculation device. Priority is claimed on Japanese Patent Application No. 2013-236904, filed Nov. 15, 2013, the content of which is incorporated herein by reference.

Description of Related Art

In an LSI (Large Scale Integration) design, a scheme called resource sharing in which a common process is extracted from a plurality of processes and a circuit that performs the common process is shared so as to suppress increase in a circuit is generally used. In this scheme, for example, when two multiplication operations are included in one process, one multiplier (resources) can be shared through shifting of respective multiplication execution timings. Adjustment of this process execution timing is called scheduling.

In such a resource sharing scheme, reduction of power consumption is desired. A scheme of sharing resources of an exclusively operating processing unit by scheduling and stopping a clock of a processing unit that does not operate to thereby reduce power consumption has been proposed in Japanese Unexamined Patent Application, First Publication No. 2008-282360.

In an actual circuit, there is a case in which a period of time required for one process is changed every use case (operation situation). Further, when a low-speed process is performed, suppression of peak power is desired. However, in the scheme described in Japanese Unexamined Patent Application, First Publication No. 2008-282360, an operation is fixed according to scheduling for the fastest processing within an assumed use case.

FIGS. 13A and 13B show an example of scheduling for the fastest processing in the scheme described in Japanese Unexamined Patent Application, First Publication No. 2008-282360. In FIGS. 13A and 13B, a horizontal axis indicates time, and a vertical axis indicates power. The unit of the time in FIGS. 13A and 13B is a cycle corresponding to a period of a clock supplied to a circuit. FIGS. 13A and 13B show examples of scheduling of a calculation device having four multipliers.

FIG. 13A shows an example of scheduling in which eight multiplication operations are performed in two cycles. An operation in one cycle in which four multipliers operate in parallel is repeated twice, and thus eight multiplication operations are performed in two cycles. In FIG. 13A, a state is shown in which two cycles in which eight multiplication operations are performed are repeated. In FIG. 13A, peak power (Pmax) is the power needed when all multipliers included in a calculation device operate in parallel.

FIG. 13B shows an example of scheduling in which eight multiplication operations are performed in four cycles. Since the scheduling is performed such that processing is fastest, four multipliers operate in parallel in two cycles. Accordingly, the eight multiplication operations are performed in two cycles. After a period of two cycles in which four multipliers operate passes, the four multipliers stop for the next two cycles. A state is shown in FIG. 13B, in which two cycles in which eight multiplication operations are performed when the four multipliers operate in parallel and two cycles in which the four multipliers stop alternately appear. In FIG. 13B, peak power (Pmax) is the power needed when all multipliers included in the calculation device operate in parallel.

As described above, in the scheme described in Japanese Unexamined Patent Application, First Publication No. 2008-282360, even when the number of cycles in which a predetermined number of calculations are performed is changed, the peak power becomes power when all multipliers included in the calculation device operate in parallel.

SUMMARY OF THE INVENTION

According to a first aspect of the present invention, a calculation device includes: a plurality of calculation processing units configured to perform different processes with each other; a plurality of calculators configured to perform a same calculation; and a control unit configured to control a number of the calculators to be operated during each of a plurality of divided periods based on a length of a predetermined processing period and a number of calculations to be performed, such that a number of data which is equal to a number of calculations is processed within a predetermined processing period, and that the number of the calculators to be operated during each of the plurality of divided periods is averaged, the divided periods being obtained by dividing up the predetermined processing period.

According to a second aspect of the present invention, in the calculation device according to the first aspect, the control unit may include a register in which the length of the processing period and the number of the calculations are set from the outside of the calculation device.

According to a third aspect of the present invention, in the calculation device according to the first aspect, the control unit may control the number of the calculators to be operated during each of the plurality of divided periods based on the length of the processing period and the number of the calculations determined based on valid data signals output from the plurality of calculation processing units.

According to a fourth aspect of the present invention, in the calculation device according to the third aspect, the length of the processing period may be a period of time determined from an interval between two valid states of the valid data signals output from the plurality of calculation processing units, and the number of calculations may be a number determined from the number of valid states of the valid data signal.

According to a fifth aspect of the present invention, the calculation device according to the third aspect may further include a mediation unit configured to control transfer of data between the plurality of the calculation processing units and the plurality of calculators and determine the length of the processing period and the number of the calculations based on valid data signals output from the plurality of calculation processing units.

DETAILED DESCRIPTION OF THE INVENTION

Hereinafter, embodiments of the present invention will be described with reference to the drawings. In embodiments below, a resource sharing scheme is used. That is, the same common calculations are extracted from among a plurality of processes and implemented as common processes. Further, different processes from the common processes among the plurality of process are implemented as specific processes. The common processes include addition, subtraction, multiplication, division, a comparison operation, a logical operation, or the like. A specific process includes a condition determination process, a substitution process, or the like. A predetermined process such as image processing is realized through the common process and the specific processing.

First Embodiment

Figure 1:
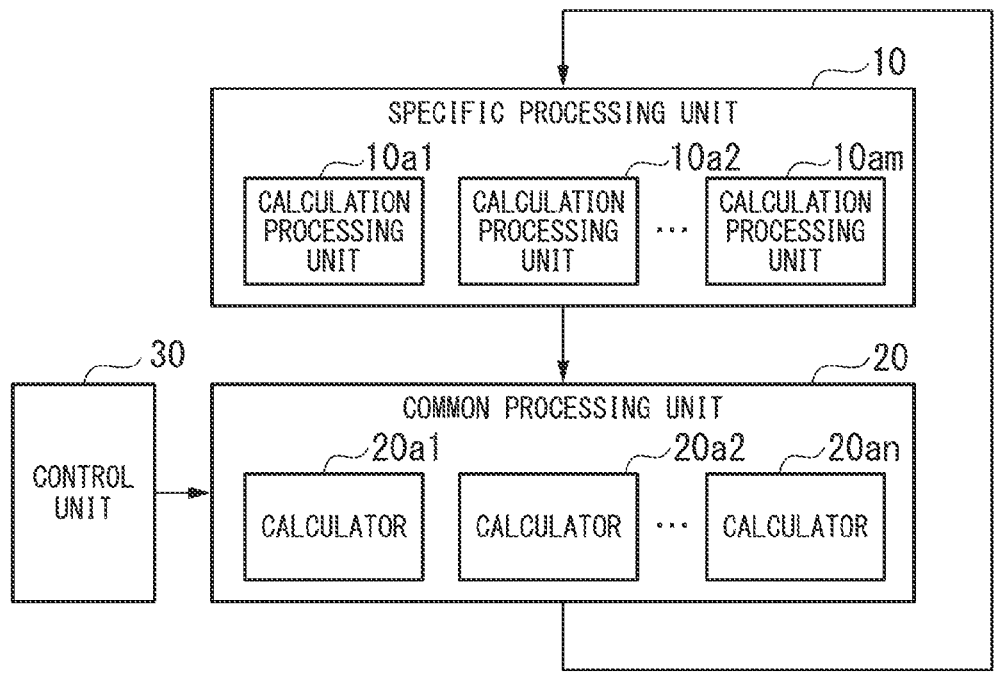
FIG. 1 is a block diagram showing a configuration of a calculation device according to a first embodiment of the present invention.

First, a first embodiment of the present invention will be described. FIG. 1 shows a configuration of a calculation device according to this embodiment. The calculation device shown in FIG. 1 includes a specific processing unit 10, a common processing unit 20, and a control unit 30.

The specific processing unit 10 includes a plurality of calculation processing units $10a1, 10a2, \ldots, 10am$ (m is an integer equal to or more than 2) that perform different processes (condition determination process and substitution process). The common processing unit 20 includes a plurality of calculators $20a1, 20a2, \ldots, 20an$ (n is an integer equal to or more than 2) that perform the same calculations (addition, subtraction, multiplication, and division). When the calculation processing units $10a1, 10a2, \ldots, 10am$ need to perform a calculation that is a common process during the own processes, the calculation processing units $10a1, 10a2, \ldots, 10am$ output data to the calculators $20a1$ and $20a2, \ldots, 20an$ and receive a calculation result from the calculators $20a1$ and $20a2, \ldots, 20an$.

The control unit 30 controls the number of calculators to be operated during a plurality of divided periods based on the length of the processing period (hereinafter referred to as processing speed) and the number of calculations. As the control unit 30 performs the control, a number of data processed during the during a predetermined processing period is equal to a number of calculations to be performed and the number of calculators to be operated during each of the plurality of the divided periods obtained by dividing up the processing period is made uniform. That is, the number of the calculators operated during each of the plurality of the divided periods is approximately equal. The processing period includes a plurality of the divided periods. The divided period is, for example, a period of time based on one cycle corresponding to a period of the clock which is supplied to the circuit. The one divided period is, for example, equal to the length of one cycle. The one divided period may be equal to the length of a plurality of cycles.

Figure 2:
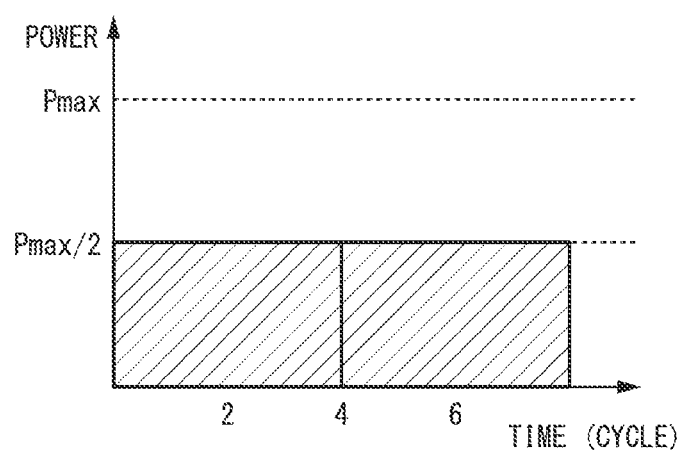
FIG. 2 is a reference diagram showing an example of scheduling that is performed by a control unit included in the calculation device according to the first embodiment of the present invention.

FIG. 2 shows an example of scheduling performed by the control unit 30. In FIG. 2, the horizontal axis indicates time, and the vertical axis indicates power. A unit of the time in FIG. 2 is a cycle. FIG. 2 shows an example of scheduling in which eight multiplication operations are performed in four cycles.

A predetermined processing period including four cycles (a period including two or more cycles in this embodiment) is divided by, for example, four divided periods each including one cycle. The control unit 30 controls the number of calculators to be operated during a plurality of divided periods so that the number of calculators to be operated during the respective divided periods (the number of calculators used for calculation in the respective divided periods) is made uniform. In FIG. 2, the scheduling is performed so that two calculators operate in parallel in each of four divided periods (1 cycle). Since the two calculators operated in parallel in every cycle, eight multiplication operations are performed in four cycles.

In the present embodiment, the control unit 30 calculates, for example, a number that is obtained by dividing the number of calculations to be performed by the processing speed, which is a length of the processing period (corresponding to the speed of performing a predetermined number of calculations). The calculated number is the number of calculators to be operated during the divided period. In the example shown in FIG. 2, since the number of calculations to be performed is 8 and the processing speed is 4 (cycles), 2 obtained by dividing 8 by 4 is the number of calculators to be operated in one cycle. Further, the control unit 30 has a register in which the length (processing speed) of the processing period and the number of calculations to be performed are set from the outside of the calculation device.

The control unit 30 may control the number of calculators to be operated during a plurality of divided periods so that one or more calculators operate in a period longer than half of the predetermined processing period. In other words, the control unit 30 may control the number of calculators to be operated during each of the plurality of divided periods so that a period in which each of the plurality of calculators stops is shorter than half of the predetermined processing period. The control unit 30 may control the number of calculators to be operated during each of the plurality of divided periods so that the number of calculators to be operated during a plurality of divided periods obtained by dividing a period except for a period in which all of the plurality of calculators stop (the period shorter than half of the processing period) in the predetermined processing period is made uniform in such a period.

Figure 3:
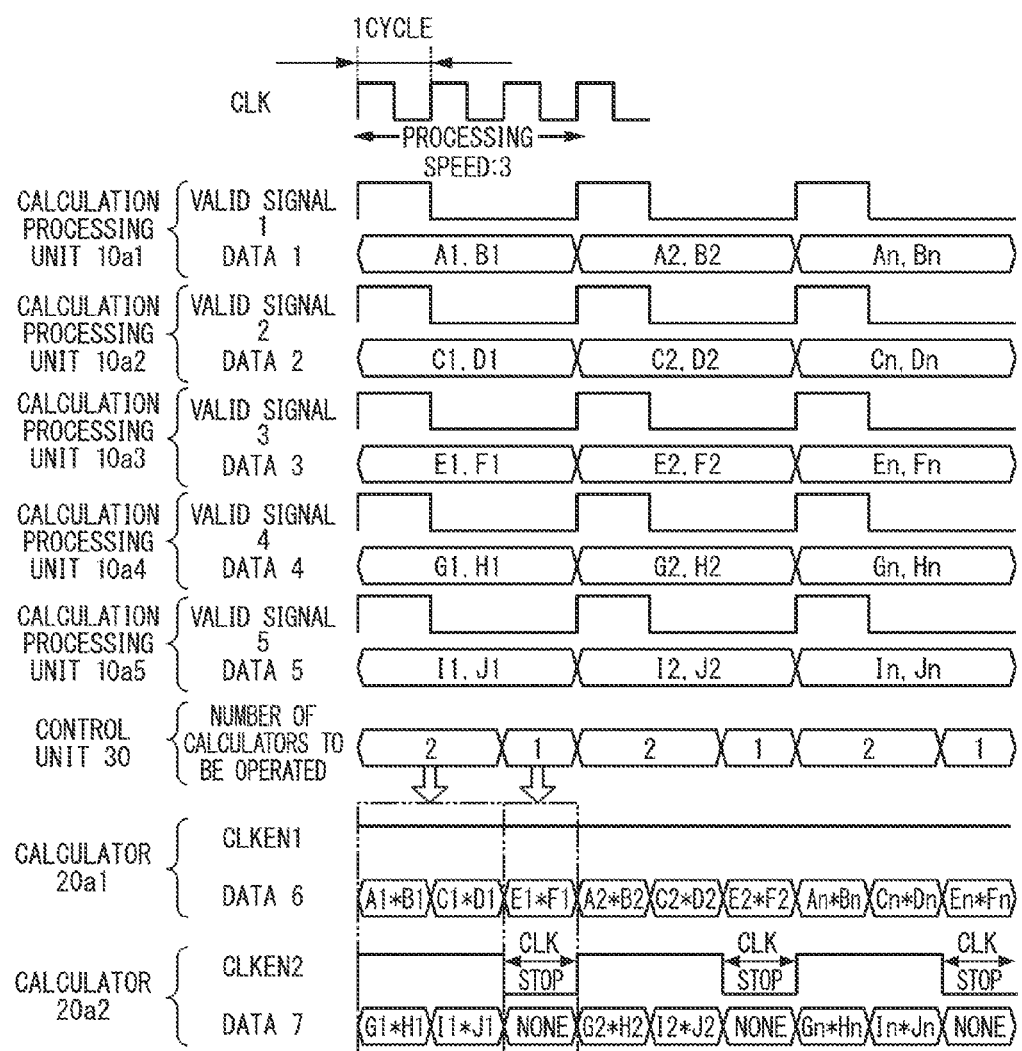
FIG. 3 is a timing chart showing an example of scheduling that is performed by the control unit included in the calculation device according to the first embodiment of the present invention.

FIG. 3 shows an example of scheduling performed by the control unit 30. A clock (CLK), valid signals (valid data signals), and data are shown in FIG. 3. The clock (CLK) is supplied to each circuit. The valid signal (valid data signal) is output from each of the calculation processing units 10a1, 10a2, 10a3, 10a4, and 10a5. The data is output from each of the calculation processing units 10a1, 10a2, 10a3, 10a4, and 10a5. Further, the number of calculators to be operated determined by the control unit 30 is shown in FIG. 3. Further, a clock enable signal (CLKEN) and data are shown in FIG. 3. The clock enable signal (CLKEN) is input to each of the calculators 20a1 and 20a2. The data is output from each of the calculators 20a1 and 20a2. The right direction in FIG. 3 is a time flow direction.

The valid signal is a rectangular wave. When the voltage of the valid signal is a high level, the valid signal is in a valid state. When the voltage of the valid signal is a low level, the valid signal is in an invalid state (not in the valid state). A period from one valid state to the next valid state is defined as a predetermined processing period. When there are a plurality of valid signals corresponding to a plurality of different pieces of data, a minimum period among periods from a valid state of the respective valid signals to the next valid state is a processing period. During this processing period, data (A1, B1, etc. shown in FIG. 3) as a calculation target is output from the calculation processing units 10a1, 10a2, 10a3, 10a4, and 10a5.

The clock enable signal is a rectangular wave. When a voltage of the clock enable signal is at a high level, the calculator to which the clock enable signal is input operates. When the voltage of the clock enable signal is at a low level, the calculator to which the clock enable signal is input stops.

FIG. 3 shows an example in which five calculations (multiplication operations in the example shown in FIG. 3) are performed in three cycles. Information of the processing speed (=3) and information of the number (=5) of calculations to be performed are stored in a register within the control unit 30 by an external configuration such as a CPU in advance. The control unit 30 reads this information from the register. The control unit 30 determines the number of calculators to be operated in each cycle based on the read information.

As described above, the control unit 30 calculates a number that is obtained by dividing the number of calculations to be performed by the processing speed. A quotient obtained by dividing 5 by 3 is 1.66 . . . . The decimal portion is rounded up (the decimal portion is deleted and the integer portion is increased by 1). Therefore, the control unit 30 controls scheduling so that the two calculators 20a1 and 20a2 operate in parallel.

When the two calculators 20a1 and 20a2 are operated, data output from the calculation processing units 10a1, 10a2, and 10a3 is input to the calculator 20a1, and data output from the calculation processing units 10a4 and 10a5 is input to the calculator 20a2. Further, a calculation result output from the calculator 20a1 is input to the calculation processing units 10a1, 10a2, and 10a3, and a calculation result output from the calculator 20a2 is input to the calculation processing units 10a4 and 10a5. For example, when the control unit 30 has a function of controlling switching between an input and an output of a circuit, a corresponding relationship between the calculation processing units 10a1, 10a2, 10a3, 10a4, and 10a5 and the calculator 20a1 and 20a2 is controlled by the control unit 30. Further, when a switch (selector) that controls the switching between the input and output of the circuit is provided, the corresponding relationship between the calculation processing units 10a1, 10a2, 10a3, 10a4, and 10a5 and the calculators 20a1 and 20a2 is controlled by the switch.

The control unit 30 sets the clock enable signal to be output to the calculators 20a1 and 20a2 to a high level in the first two cycles of the processing period of three cycles. That is, the control unit 30 operates the calculators 20a1 and 20a2 in the first two cycles of the processing period of three cycles. As a result, four multiplication operations are performed in the first two cycles.

In the first cycle, data (A1*B1) of a result of multiplication of data (A1, B1) output from the calculation processing unit 10a1 is output from the calculator 20a1. Also, data (G1*H1) of a result of multiplication of data (G1, H1) output from the calculation processing unit 10a4 is output from the calculator 20a2. In the second cycle, data (C1*D1) of a result of multiplication of data (C1, D1) output from the calculation processing unit 10a2 is output from the calculator 20a1. Also, data (I1*J1) of a result of multiplication of data (I1, J1) output from the calculation processing unit 10a5 is output from the calculator 20a2.

The control unit 30 sets the clock enable signal to be output to the calculator 20a1 to a high level in the last cycle of the processing period of three cycles. Also, the control unit 30 sets the clock enable signal to be output to the calculator 20a2 to a low level. That is, the control unit 30 operates the calculator 20a1 in the last cycle of the processing period of three cycles and stops the calculator 20a2. As a result, one multiplication is performed in the last cycle. In the third cycle, the data (E1*F1) of a result of multiplication of data (E1, F1) output from the calculation processing unit 10a3 is output from the calculator 20a1.

According to the above-described scheduling, a total of five multiplication operations are performed in the three cycles. After the processing period of three cycles ends, the calculation is performed according to the same scheduling as described above.

Scheduling other than the above-described scheduling is also available. For example, scheduling may be performed so that only the calculator 20a1 is operated in the first cycle during the processing period of three cycles, and the calculators 20a1 and 20a2 are operated in the second cycle and the third cycle.

Figure 4:
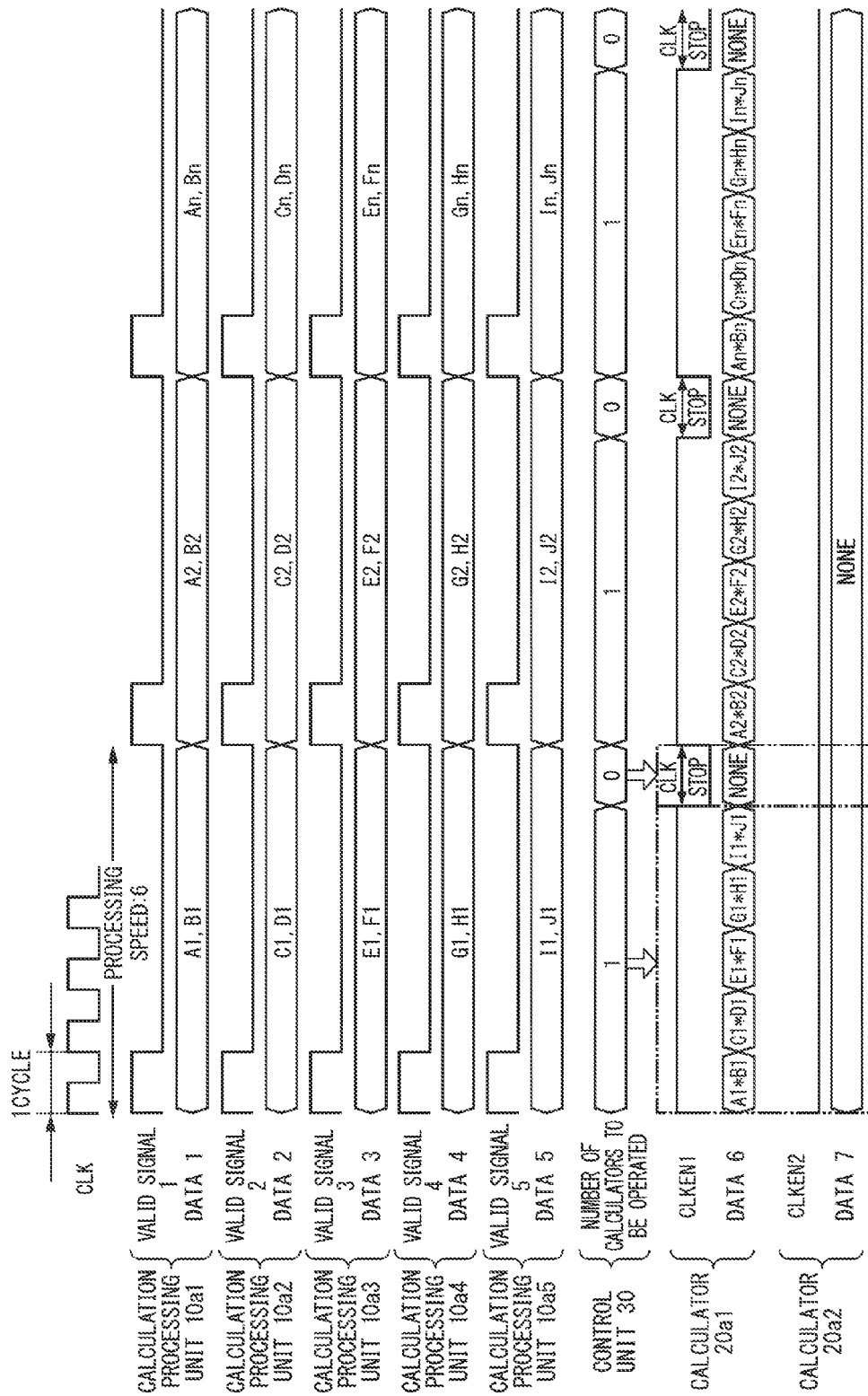
FIG. 4 is a timing chart showing an example of scheduling that is performed by the control unit included in the calculation device according to the first embodiment of the present invention.

FIG. 4 shows an example in which five calculations (multiplication operations in the example shown in FIG. 4) are performed in six cycles. A clock (CLK), valid signals (valid data signals), and data are shown in FIG. 4. The clock (CLK) is supplied to each circuit. The valid signal (valid data signal) is output from each of the calculation processing units 10a1, 10a2, 10a3, 10a4, and 10a5. The data is output from each of the calculation processing units 10a1, 10a2, 10a3, 10a4, and 10a5. Further, the number of calculators to be operated determined by the control unit 30 is shown in FIG. 4. Further, clock enable signals (CLKEN1 and CLKEN2) and data are shown in FIG. 4. The clock enable signals (CLKEN1 and CLKEN2) are input to the respective calculators 20a1 and 20a2. The data is output from each of the calculators 20a1 and 20a2. A right direction in FIG. 4 is a time flow direction.

Information of processing speed (=6) and information of the number (=5) of calculations to be performed are stored in a register within the control unit 30 by an external configuration such as a CPU in advance. The control unit 30 reads this information from the register. The control unit 30 determines the number of calculators to be operated in each cycle based on the read information.

As described above, the control unit 30 calculates a number which is obtained by dividing the number of calculations to be performed by the processing speed. A quotient obtained by dividing 5 by 6 is 0.83 . . . . The decimal portion is rounded up. Therefore, the control unit 30 controls scheduling so that only one calculator 20a1 operates.

When one calculator 20a1 is operated, data output from the calculation processing units 10a1, 10a2, 10a3, 10a4, and 10a5 is input to the calculator 20a1. Further, a calculation result output from the calculator 20a1 is input to the calculation processing units 10a1, 10a2, 10a3, 10a4, and 10a5. Switching between input and output of a circuit is controlled by the control unit 30 or a switch (selector).

The control unit 30 sets the clock enable signal to be output to the calculator 20a1 to a high level in the first five cycles of the processing period of six cycles. Also, the control unit 30 sets the clock enable signal to be output to the calculator 20a2 to a low level. That is, the control unit 30 operates the calculator 20a1 in the first five cycles of the processing period of six cycles and stops the calculator 20a2. As a result, the five multiplication operations are performed in the first six cycles and the multiplication operations are completed.

In the first cycle, data (A1*B1) of a result of multiplication of data (A1, B1) output from the calculation processing unit 10a1 is output from the calculator 20a1. In the second to fifth cycles, data of a result of multiplication of data output from the respective calculation processing units 10a2, 10a3, 10a4, and 10a5 is sequentially output from the calculator 20a1.

The control unit 30 sets the clock enable signal to be output to the calculators 20a1 and 20a2 to a low level in the last cycle of the processing period of six cycles. That is, the control unit 30 stops the calculators 20a1 and 20a2 in the last cycle of the processing period of six cycles. As a result, the multiplication is not performed in the last cycle.

According to the above-described scheduling, a total of five multiplication operations are performed in six cycles. After the processing period of six cycles ends, the calculation is performed according to the same scheduling as described above.

Scheduling other than the above-described scheduling is also available. For example, the scheduling may be performed so that the calculators 20a1 and 20a2 are stopped in any one of the first to fifth cycles in the processing period of six cycles, and only the calculator 20a1 is operated in the other cycles.

According to the present embodiment, the calculation device includes the plurality of calculation processing units 10a1, 10a2, . . . , 10am that perform different processes, the plurality of calculators 20a1, 20a2, . . . , 20an that perform the same calculation, and the control unit 30 that controls the number of calculators to be operated during the processing period based on the length of the processing period and the number of calculations so that a number of data processed during the predetermined processing period is equal to a number of calculations to be performed and the number of calculators to be operated during each of the plurality of the divided periods obtained by dividing up the predetermined processing period, is made uniform.

In the present embodiment, it is possible to suppress peak power by controlling the number of the calculators to be operated during the processing period based on the length of the processing period and the number of calculations so that the number of data processed during the predetermined processing period is equal to a number of calculations to be performed and the number of the calculators to be operated during each of the plurality of the divided periods obtained by dividing up the predetermined processing period, is made uniform.

Second Embodiment

Figure 5:
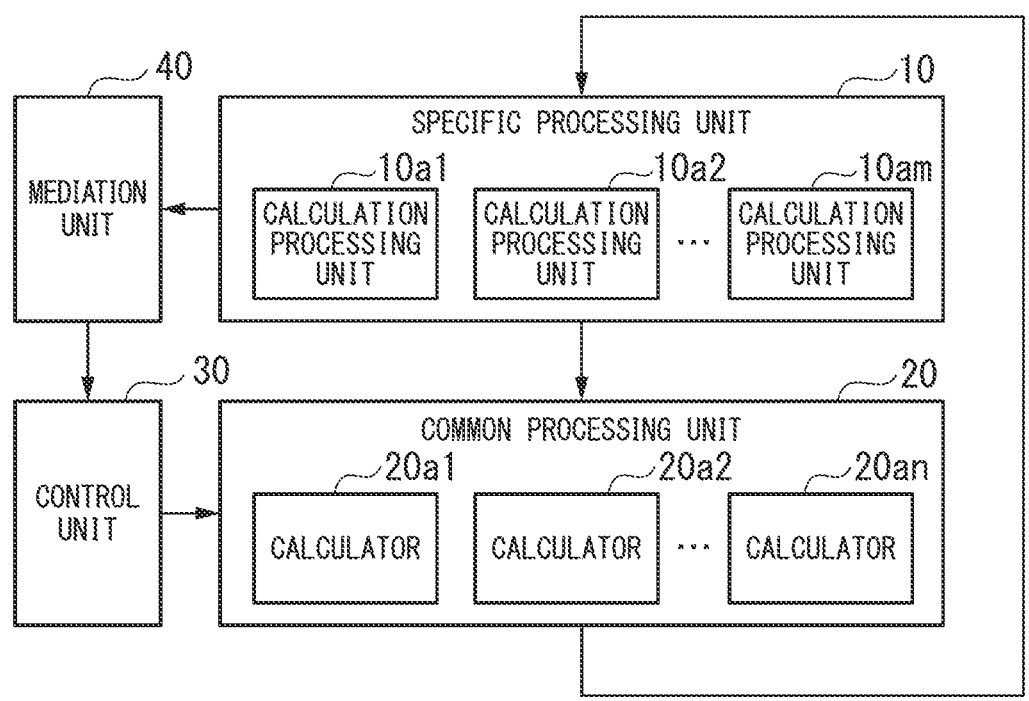
FIG. 5 is a block diagram showing a configuration of a calculation device according to a second embodiment of the present invention.

Next, a second embodiment of the present invention will be described. FIG. 5 shows a configuration of a calculation device according to this embodiment. The calculation device shown in FIG. 5 includes a specific processing unit 10, a common processing unit 20, a control unit 30, and a mediation unit 40. Since the configurations other than the mediation unit 40 have already been described, a description thereof will be omitted here.

The mediation unit 40 performs data mediation by controlling transfer of data between a plurality of calculation processing units 10a1, 10a2, . . . , 10am and a plurality of calculators 20a1, 20a2, . . . , 20an. Further, the mediation unit 40 determines the length of a processing period and the number of calculations to be performed based on valid signals (valid data signals) output from the plurality of calculation processing units 10a1, 10a2, . . . , 10am. The mediation unit 40 outputs information of the length of the processing period and information of the number of calculations to be performed, which have been determined, to the control unit 30. Further, the mediation unit 40 may control a corresponding relationship between the calculation processing units 10a1, 10a2, . . . , 10am and the calculators 20a1, 20a2, . . . , 20an in connection with the transfer of data.

The control unit 30 controls the number of calculators to be operated during the processing period based on the length of a processing period and the number of calculations to be performed, which are determined based on valid signals (valid data signals) output from the plurality of calculation processing units 10a1, 10a2, . . . , 10am. That is, the control unit 30 controls the number of calculators to be operated during the processing period based on the length of the processing period and the number of calculations to be performed determined by the mediation unit 40. The control unit 30 may have a function of determining at least one of the length of the processing period and the number of calculations to be performed among functions of the mediation unit 40.

The length (processing speed) of the processing period is a period determined based on an interval between two valid states of the valid signals (valid data signals) output from the plurality of calculation processing units 10a1, 10a2, . . . , 10am. Further, the number of calculations to be performed is a number determined based on the number of states of the valid signals (valid data signals) (a sum of the numbers of valid states of a plurality of valid signals) output from the plurality of calculation processing units 10a1, 10a2, . . . , 10am.

Figure 6:
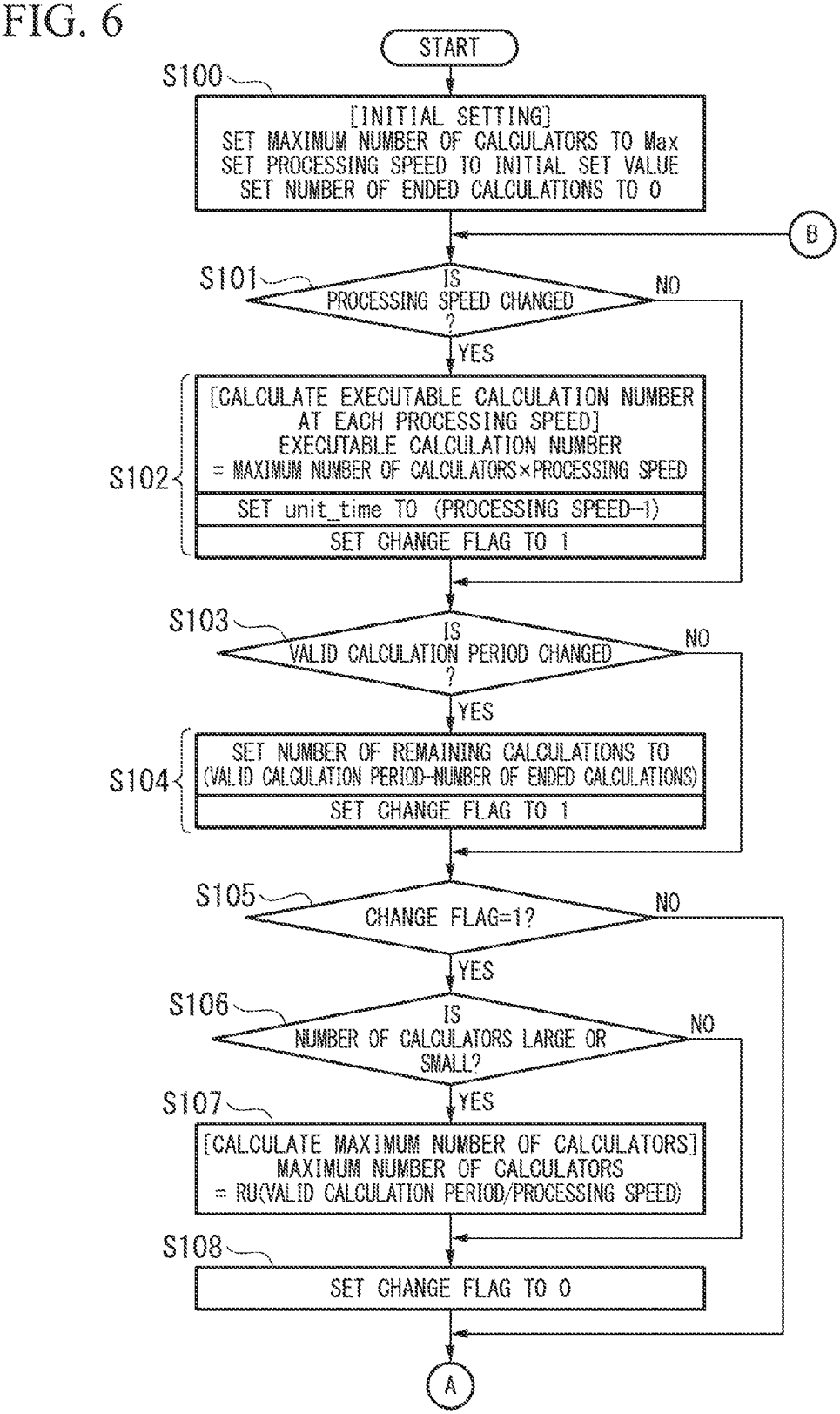
FIG. 6 is a flowchart showing a procedure of an operation of a control unit included in the calculation device according to the second embodiment of the present invention.
Figure 7:
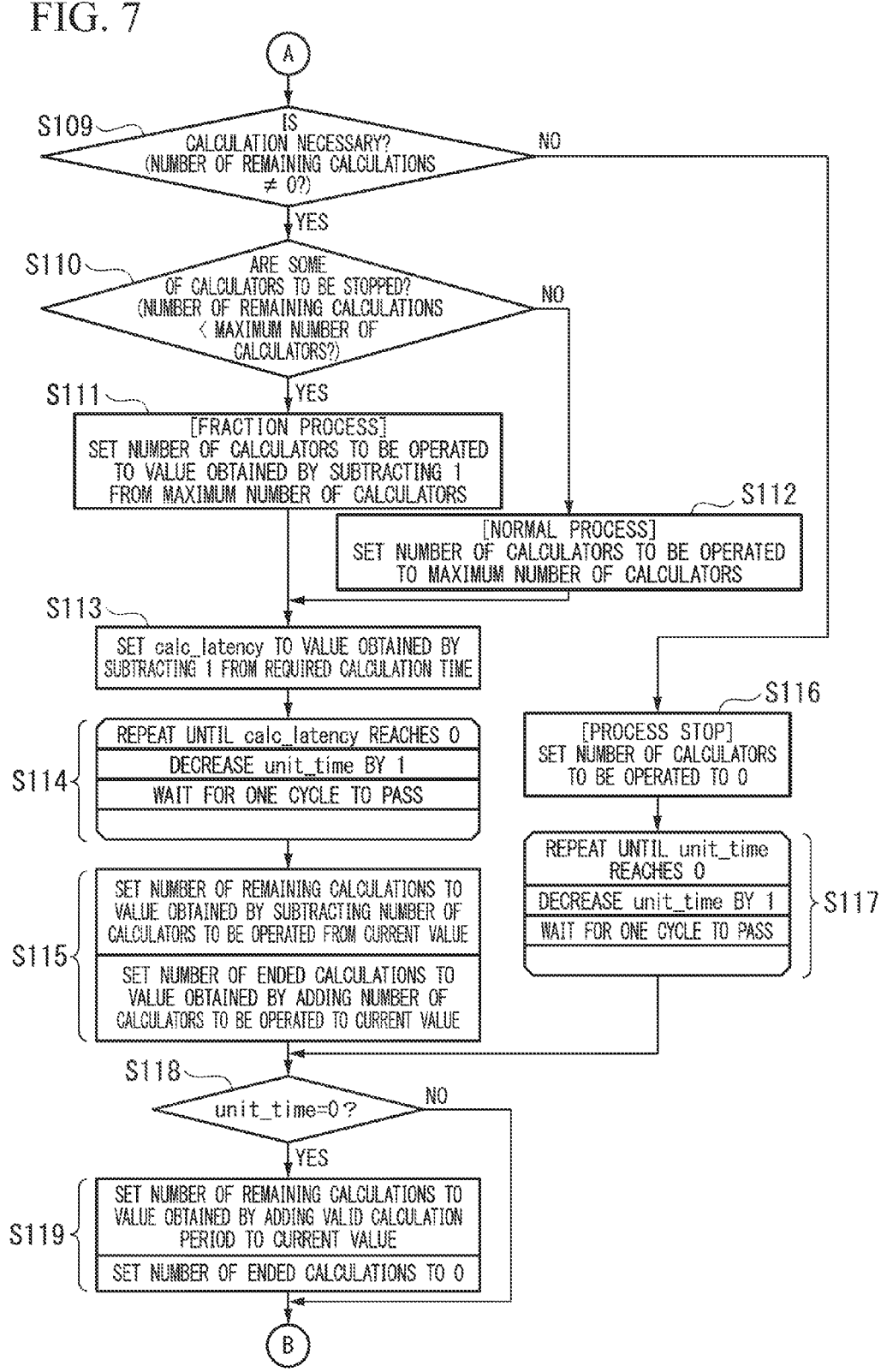
FIG. 7 is a flowchart showing a procedure of an operation of the control unit included in the calculation device according to the second embodiment of the present invention.
Figure 8:
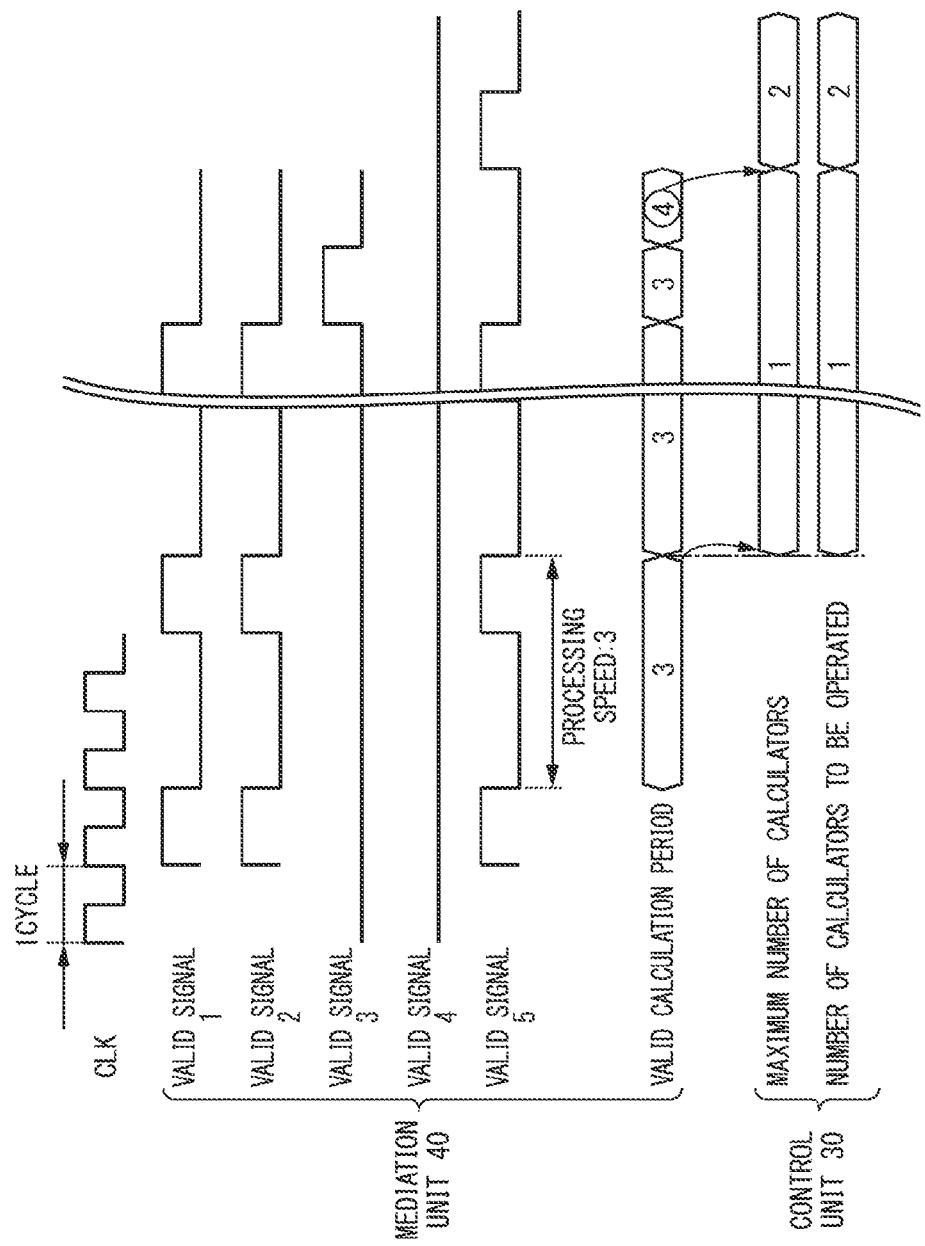
FIG. 8 is a reference diagram showing an example of scheduling that is performed by the control unit included in the calculation device according to the second embodiment of the present invention.

FIGS. 6 and 7 show an example of a procedure of an operation of the control unit 30. Further, FIG. 8 shows an example of scheduling performed by the control unit 30. A clock (CLK), valid signals (valid data signals), and a valid calculation period to be described below are shown in FIG. 8. The clock (CLK) is supplied to each circuit. The valid signal (valid data signal) is output from each of the calculation processing units 10$a$1, 10$a$2, 10$a$3, 10$a$4, and 10$a$5 and is input to the mediation unit 40. Further, the number (the maximum number of calculators and the number of calculators to be operated) managed by the control unit 30 is shown in FIG. 8. A right direction in FIG. 8 is a time flow direction.

The operation of the control unit 30 will be described with reference to FIGS. 6, 7, and 8. FIGS. 6 and 7 show content of a process performed by a combination circuit configuring the control unit 30 as a flowchart. FIGS. 6 and 7 correspond to a case in which the calculator performs one calculation in one cycle.

(Step S100)

Through an external configuration such as a CPU, a value is set for a register in the control unit 30. Accordingly, the maximum number of calculators is set to a predetermined maximum (Max), and the processing speed is set to an initial set value. The maximum number of calculators is the maximum number of available calculators to be operated. Max is, for example, a total number of calculators included in the calculation device.

(Step S101)

The control unit 30 determines the processing speed based on information output from the mediation unit 40. The control unit 30 confirms whether the determined processing speed is changed from the previously determined processing speed. When the processing speed is changed, the process proceeds to step S102. When the processing speed is not changed, the process proceeds to step S103. When the processing speed is determined for the first time after the process shown in FIG. 6 has started, the process proceeds to step S102.

(Step S102)

The control unit 30 calculates an executable calculation number using Equation (1) below. The executable calculation number is the number of calculations executable during the processing period.

$$\text{Executable calculation number} = \text{maximum number of calculators} \times \text{processing speed} \quad (1)$$

Further, the control unit 30 sets unit_time which is a variable for managing the number of cycles to a value obtained by subtracting 1 from the processing speed, and sets a change flag to 1.

(Step S103)

The control unit 30 determines a valid calculation period based on information output from the mediation unit 40. The control unit 30 confirms whether the determined valid calculation period is changed from a previously determined valid calculation period. When the valid calculation period is changed, the process proceeds to step S104. When the valid calculation period is not changed, the process proceeds to step S105. When processing speed is determined for the first time after the process shown in FIG. 6 starts, the process proceeds to step S104.

The valid calculation period indicates the number of calculations to be performed during the processing period. In FIG. 8, for example, a total number of valid states (the number of cycles) in three cycles of the respective valid signals is the valid calculation period. In the first three cycles, the valid signals 1, 2 and 5 are each in a valid state for one cycle, and the valid signals 3 and 4 are in an invalid state. Therefore, the valid calculation period is 3. The valid signal indicates data which is a calculation target. Since the valid signals 1, 2 and 5 are in the valid state, data that is a calculation target is output from the calculation processing units 10$a$1, 10$a$2, and 10$a$5. That is, it is seen that the calculation is necessary for data of three cycles. The valid calculation period indicates a period of time (equivalent to the number of calculations to be performed) necessary for this calculation.

(Step S104)

The control unit 30 sets the number of remaining calculations to a value of the valid calculation period and sets the change flag to 1. The number of remaining calculations indicates the number of necessary calculations. The number of remaining calculations is decreased each time the calculation is performed.

(Step S105)

The control unit 30 determines whether the change flag is 1. When the change flag is 1, the process proceeds to step S106. When the change flag is not 1, the process proceeds to step S109.

(Step S106)

The control unit 30 determines whether the number of calculators necessary for calculation is large or small. When a condition of Equation (2) below is satisfied, the number of calculators necessary for calculation is large, and thus the process proceeds to step S107 in which the maximum number of calculators is changed.

$$\text{Calculation validity period} \leq \text{executable calculation number} - \text{processing speed} \quad (2)$$

When a condition of Equation (3) below is satisfied, the number of calculators necessary for calculation is small, and thus the process proceeds to step S107 in which the maximum number of calculators is changed.

$$\text{Operation validity period} > \text{executable calculation number} \quad (3)$$

When neither Equation (2) nor (3) is satisfied, the process proceeds to step S108.

(Step S107)

The control unit 30 calculates the maximum number of calculators using Equation (4) below.

$$\text{Maximum number of calculators} = \text{RU}(\text{valid calculation period}/\text{processing speed}) \quad (4)$$

RU of Equation (4) means that the decimal portion is rounded up (the decimal portion is deleted and the integer portion is increased by 1).

(Step S108)

The control unit 30 sets the change flag to 0.

(Step S109)

The control unit 30 determines whether the calculation is necessary by determining whether the number of remaining calculations is 0. When the number of remaining calculations is not 0, the calculation is necessary, and thus the process proceeds to step S110. When the number of remaining calculations is 0, the calculation is not necessary, and thus the process proceeds to step S116.

(Step S110)

The control unit 30 determines whether some of the calculators are to be stopped by comparing the number of remaining calculations with the maximum number of calculators. When the number of remaining calculations is smaller than the maximum number of calculators, the process proceeds to step S111 to stop some calculators. When the number of remaining calculations is equal to or more than the maximum number of calculators, the process proceeds to step S112 without stopping the calculators.

(Step S111)

The control unit 30 sets the number of calculators to be operated to a value obtained by subtracting 1 from the maximum number of calculators. In the next cycle, the clock enable signal at a high level is output to the set number of calculators.

(Step S112)

The control unit 30 sets the number of calculators to be operated to the maximum number of calculators. In the next cycle, the clock enable signal at a high level is output to the set number of calculators.

(Step S113)

The control unit 30 sets calc_latency which is a variable for managing a calculation time to a value obtained by subtracting 1 from a required calculation time. The required calculation time is the number of cycles required for a calculator to perform one calculation. In this example, since the required calculation time is one cycle, calc_latency is set to 0.

(Step S114)

The following process is repeated until calc_latency reaches 0. The control unit 30 decreases unit_time by 1. Further, the control unit 30 waits for one cycle to pass. After one cycle passes, the determination of calc_latency is performed. For example, calc_latency reaches 0 in step S113, and unit_time is decreased by 1 and one cycle passes in step S114. Then, calc_latency is confirmed to be 0, and the process of step S114 ends.

(Step S115)

The control unit 30 sets the number of remaining calculations to a value obtained by subtracting the maximum number of calculators from the number of current remaining calculations. Then, the process proceeds to step S101.

(Step S116)

The control unit 30 sets the number of calculators to be operated to 0. In the next cycle, a clock enable signal at a low level is output to all the calculators.

(Step S117)

The following process is performed until unit_time reaches 0. The control unit 30 decreases unit_time by 1. Further, the control unit 30 waits for one cycle to pass. Then, the process proceeds to step S101. In step S117, a number of cycles according to the decreased unit_time pass. The determination of unit_time is performed after one cycle passes. For example, when unit_time is k (k≥1), unit_time is decreased by k and k cycles pass in step S114. Then, unit_time is confirmed to be 0, and the process of step S117 ends. Then, the process proceeds to step S118.

(Step S118)

The control unit 30 determines whether unit_time is 0. When unit_time is 0, the process proceeds to step S119. When unit_time is not 0, the process proceeds to step S101.

(Step S118)

The control unit 30 sets the number of remaining calculations to a value obtained by adding the valid calculation period to the number of current remaining calculations, and sets the number of ended calculations to 0. Then, the process proceeds to step S101.

The scheduling shown in FIG. 8 will be described. The processing speed is three cycles. Three valid signals 1, 2, and 5 are in a valid state during a first processing period, and thus the valid calculation period is three cycles. Hereinafter, the process in the first processing period (three cycles) will be described.

(First Cycle)

Since the maximum number of calculators is set, for example, to 5 and the processing speed is set to 3 (corresponding to step S100), the executable calculation number is 15 (corresponding to step S102). Further, the number of remaining calculations becomes 3 (corresponding to step S104).

Since the condition of Equation (2) is satisfied, the maximum number of calculators is 1 according to Equation (4) (corresponding to step S107). Since the number (=3) of remaining calculations is not 0 (corresponding to step S109) but is greater than the maximum number (=1) of calculators (corresponding to step S110), the number of calculators to be operated is 1 (corresponding to step S112). After one cycle passes (corresponding to step S114), the number of remaining calculations becomes 2 and the number of ended calculations is 1 (corresponding to step S115).

(Second Cycle)

The processing speed and the valid calculation period are not changed. Since the number (=2) of the remaining calculations is not 0 (corresponding to step S109) but is greater than the maximum number (=1) of calculators (corresponding to step S110), the number of calculators to be operated remains 1 (corresponding to step S112). After one cycle passes (corresponding to step S114), the number of remaining calculations becomes 1, and the number of ended calculations is 2 (corresponding to step S115).

(Third Cycle)

The processing speed and the valid calculation period are not changed. Since the number (=1) of remaining calculations is not 0 (corresponding to step S109) but is equal to the maximum number (=1) of calculators (corresponding to step S110), the number of calculators to be operated remains 1 (corresponding to step S112). After one cycle passes (corresponding to step S114), the number of remaining calculations becomes 0, and the number of ended calculations is 3 (corresponding to step S115). Further, the number of remaining calculations becomes 3, and the number of ended calculations is 0 (corresponding to step S119).

After the first processing period, the same process as the above process is performed in each processing period of three cycles.

As shown in FIG. 8, as the valid signal 3 is in a valid state during the processing period after the first processing period, the valid calculation period is changed from 3 to 4. Hereinafter, a process in a processing period (three cycles) of this case will be described.

(First Cycle)

The number of calculators to be operated is 1, which is equal to the number in the previous cycle. The processing speed is 3, which is equal to the number in the previous cycle. The valid calculation period is 3, which is equal to the number in the previous cycle. The number of remaining calculations is set to 3 in a third cycle in an immediately previous processing period (corresponding to step S119).

Since the number (=3) of remaining calculations is not 0 (corresponding to step S109) but is greater than the maximum number (=1) of calculators (corresponding to step S110), the number of calculators to be operated remains 1 (corresponding to step S112). After one cycle passes (corresponding to step S114), the number of remaining calculations is 2, and the number of ended calculations is 1 (corresponding to step S115).

(Second Cycle)

The processing speed is not changed. Since the valid calculation period is changed into four cycles (corresponding to step S103), the number of remaining calculations is set to 4 (corresponding to step S104).

Since the executable calculation number remains 15 and the condition of Equation (2) is satisfied, the maximum number of calculators becomes 2 according to Equation (4) (corresponding to step S107). Since the number (=3) of remaining calculations is not 0 (corresponding to step S109) but is greater than the maximum number (=2) of calculators (corresponding to step S110), the number of calculators to be operated is 2 (corresponding to step S112). After one cycle passes (corresponding to step S114), the number of remaining calculations is 1, and the number of ended calculations is 3 (corresponding to step S115).

(Third Cycle)

The processing speed and the valid calculation period are not changed. Since the number (=1) of the remaining calculations is not 0 (corresponding to step S109) but is smaller than the maximum number (=2) of calculators (corresponding to step S110), the number of calculators to be operated is 1 (corresponding to step S111). After one cycle passes (corresponding to step S114), the number of remaining calculations is 0, and the number of ended calculations is 4 (corresponding to step S115). Further, the number of remaining calculations is 4, and the number of ended calculations is 0 (corresponding to step S119).

In the operation described above, since the number of calculators to be operated during the processing period is controlled based on information (the length of the processing period and the number of calculations to be performed) determined based on the valid signal, it is possible to suppress the number of calculators in units of one cycle. That is, it is possible to dynamically suppress the number of calculators.

Figure 9:
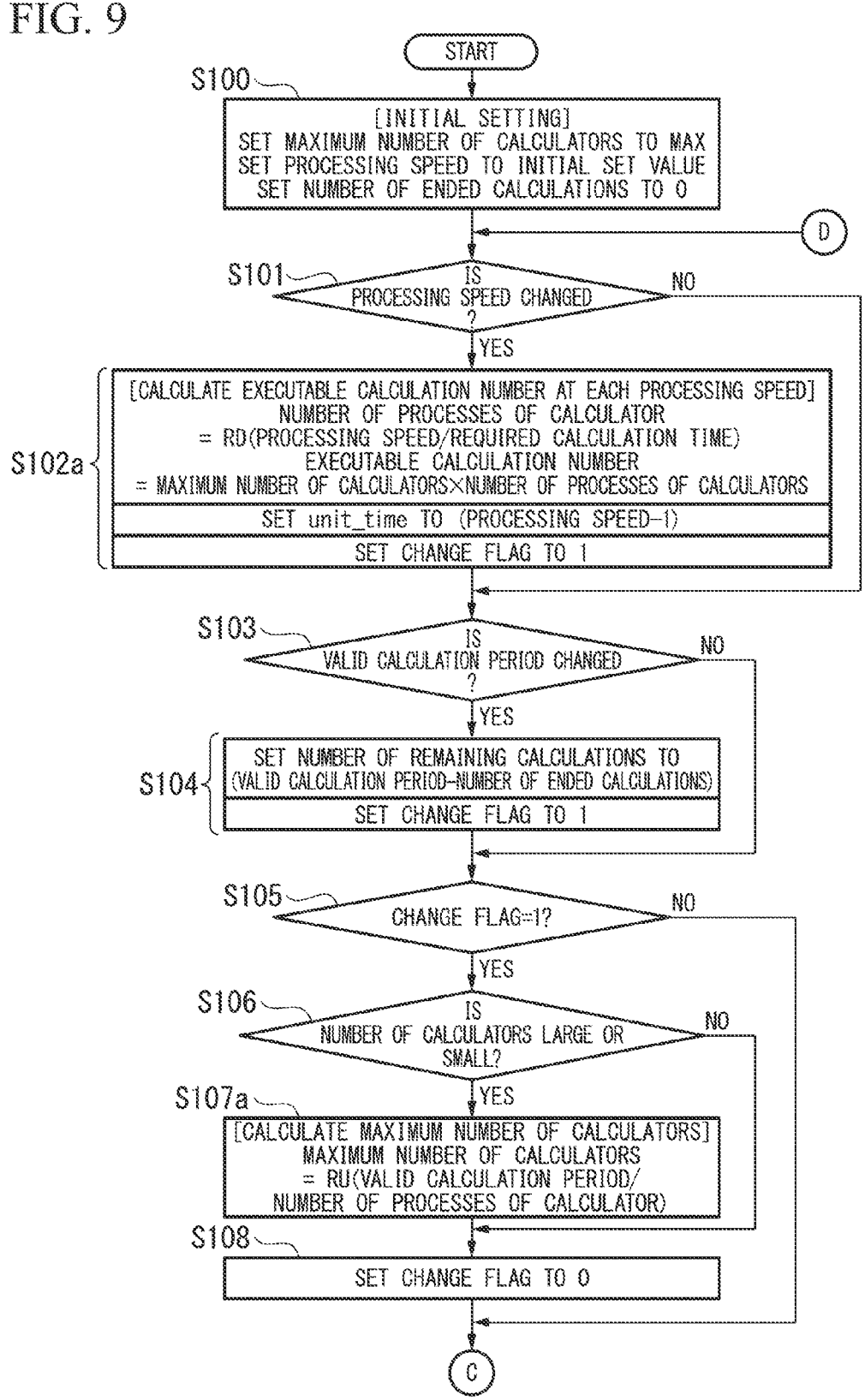
FIG. 9 is a flowchart showing a procedure of an operation of the control unit included in the calculation device according to the second embodiment of the present invention.
Figure 10:
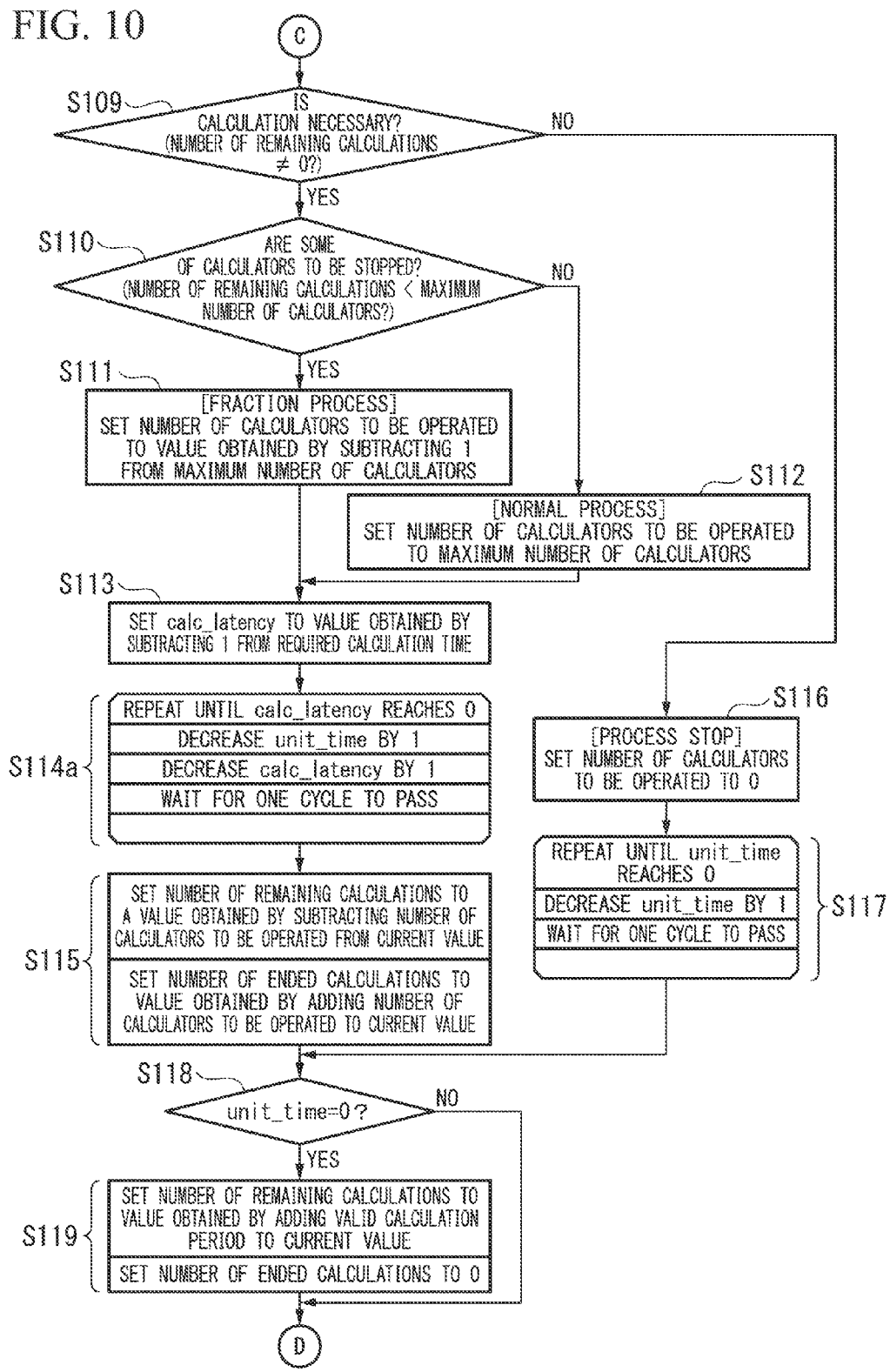
FIG. 10 is a flowchart showing a procedure of an operation of the control unit included in the calculation device according to the second embodiment of the present invention.

FIGS. 9 and 10 show another example of the procedure of an operation of the control unit 30. FIGS. 9 and 10 correspond to a case in which the calculator performs one calculation in a plurality of cycles.

In FIGS. 9 and 10, the same processes as the processes shown in FIGS. 6 and 7 are denoted with the same signs. Hereinafter, only different processes from the processes shown in FIGS. 6 and 7 will be described. Step S102 in FIG. 6 is changed to step S102a in FIG. 9. Step S107 in FIG. 6 is changed to step S107a in FIG. 9. Step S114 in FIG. 7 is changed to step S114a in FIG. 10.

(Step S102a)

The control unit 30 calculates the number of processes of the calculator using Equation (5) below. The number of processes of the calculator is the number of times the calculator performs calculation during a processing period.

Number of processes of calculator=RD(processing speed/required calculation time)   (5)

RD of Equation (5) means that a decimal portion is deleted.

Further, the control unit 30 calculates the executable calculation number using Equation (6) below.

Executable calculation number=maximum number of calculators×number of processes of calculators   (6)

Further, the control unit 30 sets unit_time which is a variable for managing the processing speed to a value obtained by subtracting 1 from the processing speed, and sets the change flag to 1.

(Step S107a)

The control unit 30 calculates the maximum number of calculators using Equation (7) below.

Maximum number of calculators=RU(valid calculation period/number of processes of calculator)   (7)

RU of Equation (7) means that the decimal portion is rounded up (the decimal portion is deleted and the integer portion is increased by 1).

(Step S114a)

When calc_latency is not 0, the following process is performed. The control unit 30 decreases unit_time by 1 and decreases calc_latency by 1. Further, the control unit 30 waits for one cycle to pass.

Figure 11:
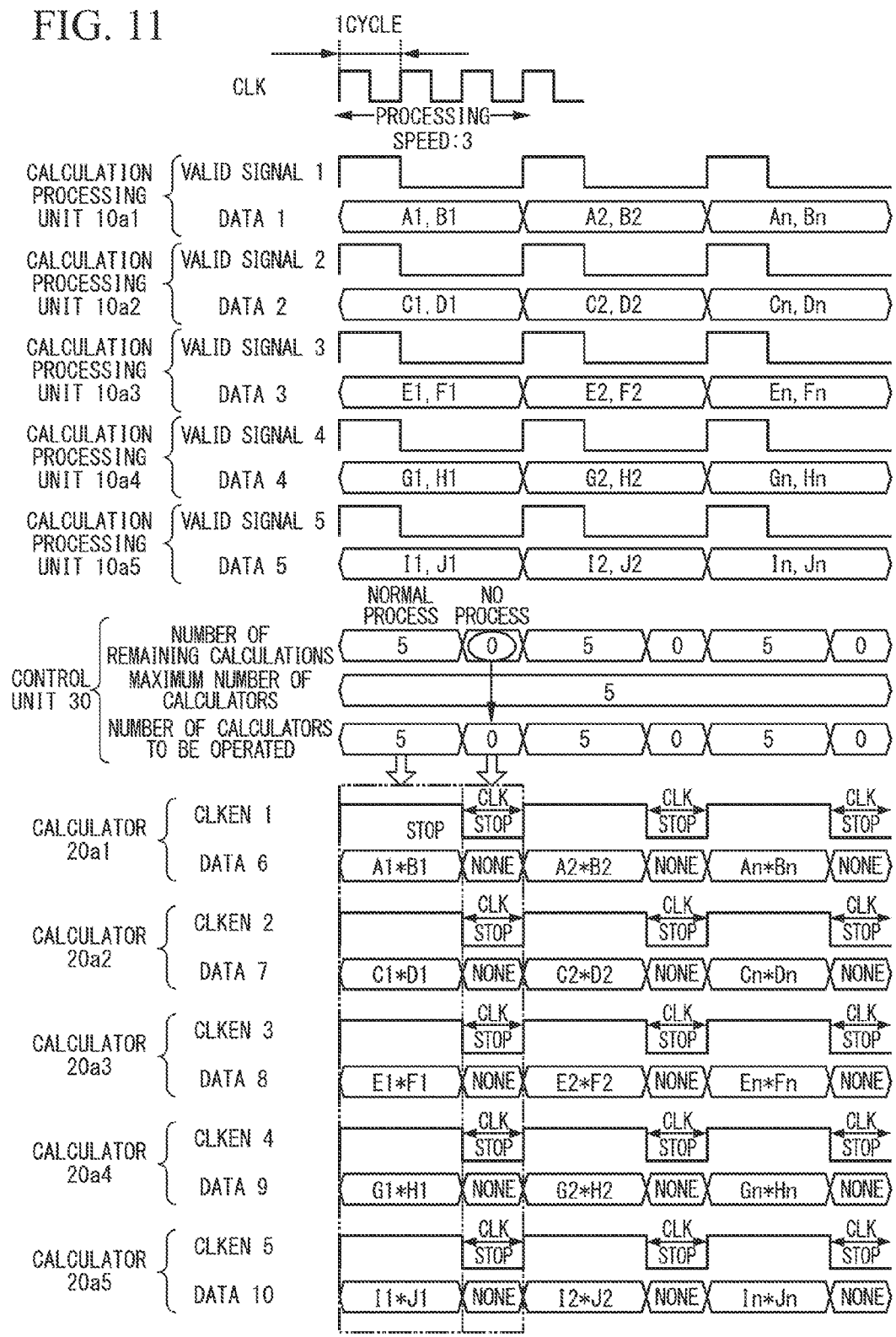
FIG. 11 is a reference diagram showing an example of scheduling that is performed by the control unit included in the calculation device according to the second embodiment of the present invention.

FIG. 11 shows an example of scheduling performed by the control unit 30. A clock (CLK), valid signals (valid data signals), and data are shown in FIG. 11. The clock (CLK) is supplied to each circuit. The valid signal (valid data signal) is output from each of the calculation processing units 10a1, 10a2, 10a3, 10a4, and 10a5. The data is output from each of the calculation processing units 10a1, 10a2, 10a3, 10a4, and 10a5. Further, numbers (the number of remaining calculations, the maximum number of calculators, and the number of calculators to be operated) managed by the control unit 30 are shown in FIG. 11. Further, a clock enable signal (CLKEN) and data are shown in FIG. 11. The clock enable signal (CLKEN) is input to the respective calculators 20a1, 20a2, 20a3, 20a4, and 20a5. The data is output from the respective calculators 20a1, 20a2, 20a3, 20a4, and 20a5. A right direction in FIG. 11 is a time flow direction.

FIG. 11 shows an example in which calculation (multiplication in the example shown in FIG. 11) is performed in three cycles. The calculators 20a1, 20a2, 20a3, 20a4, and 20a5 perform one multiplication in two cycles. Hereinafter, a process in a first processing period (three cycles) will be described.

(First Cycle)

Since the valid signals output from all the calculation processing units 10a1, 10a2, 10a3, 10a4, and 10a5 are in a valid state, the valid calculation period includes five cycles. The maximum number of calculators is set to 5, and processing speed is set to 3 (corresponding to step S100). Since the processing speed is 3 and the required calculation time is 2, the number of processes of the calculator is 1 (corresponding to step S102a). Therefore, the executable calculation number is 5 (corresponding to step S102a). Further, the number of remaining calculations is 5 (corresponding to step S104).

Since the valid calculation period and the executable calculation number are equal (step S106), the maximum number of calculators is not changed. Since the number (=5) of the remaining calculations is not 0 (corresponding to step S109), the number (=5) of the remaining calculations is to the maximum number (=5) of calculators (corresponding to step S110), the number of calculators to be operated is 5 (corresponding to step S112). Since the required calculation time is 2, calc_latency is set to 1 (corresponding to step S113). After the two cycles pass (corresponding to step S114a), the number of remaining calculations is 0, and the number of ended calculations is 5 (corresponding to step S115).

(Third Cycle)

The processing speed and the valid calculation period are not changed. Since the number of remaining calculations is 0 (corresponding to step S109), the number of calculators to be operated is 0 (corresponding to step S116). In the third cycle, unit_time is 0. After one cycle passes (corresponding to step S117), the number of remaining calculations is 5, and the number of ended calculations is 0 (corresponding to step S119). Then, the process in the next processing period (three cycles) is performed.

The control unit 30 sets the clock enable signal output to each of the calculators 20a1, 20a2, 20a3, 20a4, and 20a5 to a high level in the first two cycles of the processing period of three cycles. That is, the control unit 30 operates the calculators 20a1, 20a2, 20a3, 20a4, and 20a5 in the first two cycles of the processing period of three cycles. As a result, five multiplication operations are performed in the first two cycles, and multiplication is completed.

The control unit 30 sets the clock enable signal to be output to each of the calculators 20$a$1, 20$a$2, 20$a$3, 20$a$4, and 20$a$5 to a low level in the last cycle of the processing period of three cycles. That is, the control unit 30 stops calculators 20$a$1, 20$a$2, 20$a$3, 20$a$4, and 20$a$5 in the last cycle of the processing period of three cycles. As a result, multiplication is not performed in the last cycle.

According to the scheduling described above, a total of five multiplication operations are performed in three cycles. After the first processing period ends, the calculation is performed according to the same scheduling as described above.

Figure 12:
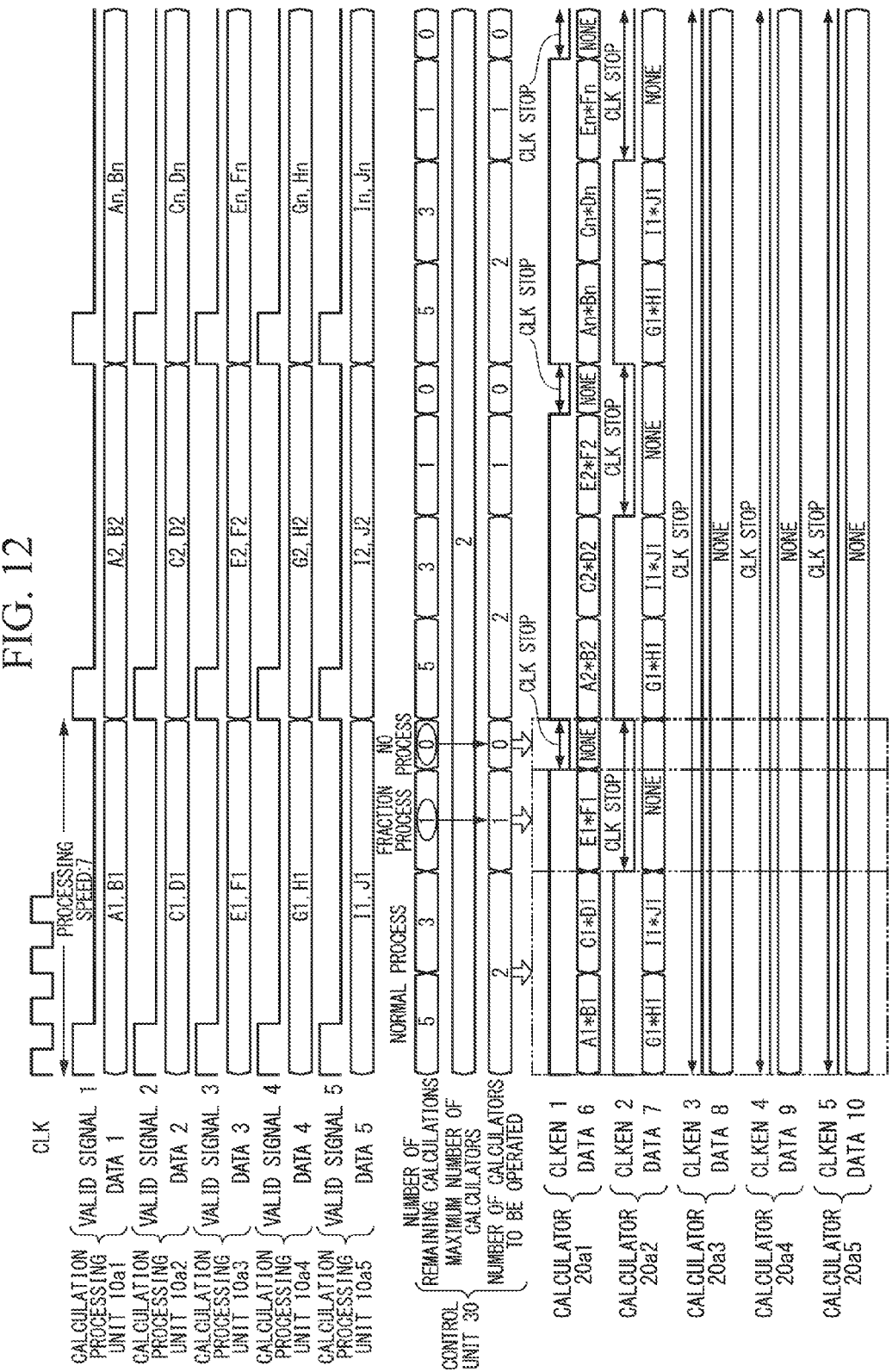
FIG. 12 is a reference diagram showing an example of scheduling that is performed by the control unit included in the calculation device according to the second embodiment of the present invention.
Figure 13A:
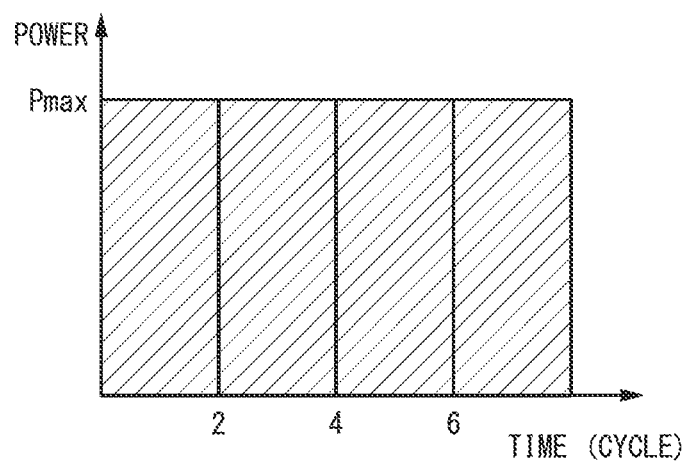
FIG. 13A is a reference diagram showing an example of scheduling for the fastest processing in the case of scheduling in which eight multiplication operations are performed in two cycles.
Figure 13B:
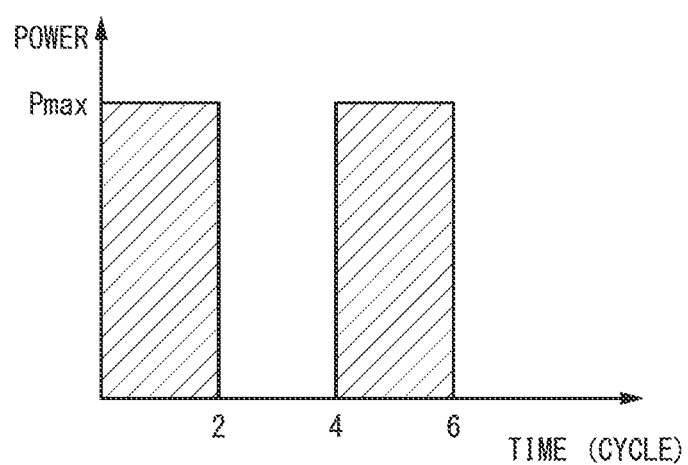
FIG. 13B is a reference diagram showing an example of scheduling for the fastest processing in the case of scheduling in which eight multiplication operations are performed in four cycles.

FIG. 12 shows an example in which calculation (multiplication in the example shown in FIG. 12) is performed in seven cycles. A clock (CLK), valid signals (valid data signals), and data are shown in FIG. 12. The clock (CLK) is supplied to each circuit. The valid signal (valid data signal) is output from the respective calculation processing units 10$a$1, 10$a$2, 10$a$3, 10$a$4, and 10$a$5. The data is output from the respective calculation processing units 10$a$1, 10$a$2, 10$a$3, 10$a$4, and 10$a$5. Further, numbers (number of remaining calculations, the maximum number of calculators, and the number of calculators to be operated) managed by the control unit 30 are shown in FIG. 12. Further, clock enable signals (CLKEN1, CLKEN2, CLKEN3, CLKEN4, and CLKEN5) and data are shown in FIG. 12. The clock enable signals (CLKEN1, CLKEN2, CLKEN3, CLKEN4, and CLKEN5) are input to the respective calculators 20$a$1, 20$a$2, 20$a$3, 20$a$4, and 20$a$5. The data is output from the respective calculators 20$a$1, 20$a$2, 20$a$3, 20$a$4, and 20$a$5. A right direction in FIG. 12 is a time flow direction.

The calculators 20$a$1, 20$a$2, 20$a$3, 20$a$4, and 20$a$5 perform one multiplication in two cycles. Hereinafter, a process in a first processing period (seven cycles) will be described.

(First Cycle)

Since the valid signals output from all the calculation processing units 10$a$1, 10$a$2, 10$a$3, 10$a$4, and 10$a$5 are in a valid state, the valid calculation period includes five cycles. The maximum number of calculators is set to 5, and processing speed is set to 7 (corresponding to step S100). Since the processing speed is 7 and the required calculation time is 2, the number of processes of the calculator is 3 (corresponding to step S102$a$). Therefore, an executable calculation number is 15 (corresponding to step S102$a$). Further, the number of remaining calculations is 5 (corresponding to step S104).

Since the condition of Equation (2) is satisfied (step S106), the maximum number of calculators is 2 according to Equation (7) (corresponding to step S107$a$). Since the number (=5) of the remaining calculations is not 0 (corresponding to step S109) but is greater than the maximum number (=2) of calculators (corresponding to step S110), the number of calculators to be operated is 2 (corresponding to step S112). Since the required calculation time is 2, calc_latency is set to 1 (corresponding to step S113). After two cycles pass (corresponding to step S114$a$), the number of remaining calculations is 3, and the number of ended calculations is 2 (corresponding to step S115).

(Third Cycle)

The processing speed and the valid calculation period are not changed. Since the number (=3) of remaining calculations is not 0 (corresponding to step S109) but is greater than the maximum number (=2) of calculators (corresponding to step S110), the number of calculators to be operated is 2 (corresponding to step S112). Since a required calculation time is 2, calc_latency is set to 1 (corresponding to step S113). After two cycles pass (corresponding to step S114$a$), the number of remaining calculations is 1, and the number of ended calculations is 4 (corresponding to step S115).

(Fifth Cycle)

The processing speed and the valid calculation period are not changed. Since the number (=1) of the remaining calculations is not 0 (corresponding to step S109) but is smaller than the maximum number (=2) of calculators (corresponding to step S110), the number of calculators to be operated is 1 (corresponding to step S111). Since the required calculation time is 2, calc_latency is set to 1 (corresponding to step S113). After two cycles pass (corresponding to step S114$a$), the number of remaining calculations is 0, and the number of ended calculations is 5 (corresponding to step S115).

(Seventh Cycle)

The processing speed and the valid calculation period are not changed. Since the number of remaining calculations is 0 (corresponding to step S109), the number of calculators to be operated is 0 (corresponding to step S116). In the seventh cycle, unit_time is 0. After one cycle passes (corresponding to step S117), the number of remaining calculations is 5, and the number of ended calculations is 0 (corresponding to step S119). A process in the next processing period (seven cycles) is performed.

The control unit 30 sets the clock enable signal output to each of the calculators 20$a$1 and 20$a$2 to a high level in the first four cycles of the processing period of seven cycles, and sets the clock enable signal to be output to the calculator 20$a$3, 20$a$4, and 20$a$5 to a low level. That is, the control unit 30 operates the calculators 20$a$1 and 20$a$2 in the first four cycles of the processing period of seven cycles and stops the calculators 20$a$3, 20$a$4, and 20$a$5. As a result, four multiplication operations are performed in the first four cycles.

The control unit 30 sets the clock enable signal output to the calculator 20$a$1 to a high level in the next two cycles of the processing period of seven cycles and sets the clock enable signal to be output to the calculator 20$a$2, 20$a$3, 20$a$4, and 20$a$5 to a low level. That is, the control unit 30 operates the calculator 20$a$1 in the next two cycles of the processing period of seven cycles and stops the calculators 20$a$2, 20$a$3, 20$a$4, and 20$a$5. As a result, one multiplication is performed in the next two cycles. Five multiplication operations are performed up to this point in time. That is, the multiplication is completed.

The control unit 30 sets the clock enable signal output to each of the calculators 20$a$1, 20$a$2, 20$a$3, 20$a$4, and 20$a$5 to a low level in the last cycle of the processing period of seven cycles. That is, the control unit 30 stops the calculators 20$a$1, 20$a$2, 20$a$3, 20$a$4, and 20$a$5 in the last cycle of the processing period of seven cycles. As a result, the multiplication is not performed in the last cycle.

According to the scheduling described above, a total of five multiplication operations are performed in seven cycles. After the first processing period ends, the calculation is performed according to the same scheduling as described above.

In this embodiment, it is possible to dynamically suppress the number of calculators in units of one cycle since the number of calculators to be operated during the processing period is controlled based on the information (the length of the processing period and the number of calculations to be performed) determined based on the valid signal. Therefore, it is possible to dynamically perform control for suppressing peak power depending on a situation of data that is a calculation target.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A calculation device comprising:
   a plurality of calculation processing units stored in a computer-readable hardware storage medium configured to perform different processes with each other;
   a plurality of calculators configured to perform a same calculation; and
   a control unit configured to control a number of the calculators to be operated during each of a plurality of divided periods
      based on
         a length of a predetermined processing period and
         a number of calculations to be performed,
      such that a number of data which is equal to a number of calculations is processed within a predetermined processing period, and
      that the number of the calculators to be operated during each of the plurality of divided periods is averaged, the divided periods being obtained by dividing up the predetermined processing period.

2. The calculation device according to claim 1, wherein the control unit includes a register in which the length of the processing period and the number of the calculations are set from outside of the calculation device.

3. The calculation device according to claim 1, wherein the control unit controls the number of the calculators to be operated during each of the plurality of divided periods based on the length of the processing period and the number of the calculations determined based on valid data signals output from the plurality of calculation processing units.

4. The calculation device according to claim 3, wherein the length of the processing period is a period of time determined from an interval between two valid states of the valid data signals output from the plurality of calculation processing units, and
the number of the calculations is a number determined from the number of valid states of the valid data signal.

5. The calculation device according to claim 3, further comprising a mediation unit configured to control transfer of data between the plurality of the calculation processing units and the plurality of calculators and determine the length of the processing period and the number of the calculations based on the valid data signals output from the plurality of calculation processing units.

* * * * *